United States Patent
Peterson et al.

(10) Patent No.: US 9,169,976 B2
(45) Date of Patent: Oct. 27, 2015

(54) METHOD OF MANUFACTURE OF A METAL HYDRIDE FUEL SUPPLY

(71) Applicant: Ardica Technologies, Inc., San Francisco, CA (US)

(72) Inventors: Andrew Philip Gust Peterson, San Francisco, CA (US); Sergio Morales Galvan, San Francisco, CA (US); Eric Allen Wooley, San Francisco, CA (US); Daniel Braithwaite, San Francisco, CA (US)

(73) Assignee: Ardica Technologies, Inc., San Francisco, CA (US)

( * ) Notice: Subject to any disclaimer, the term of this patent is extended or adjusted under 35 U.S.C. 154(b) by 322 days.

(21) Appl. No.: 13/683,973

(22) Filed: Nov. 21, 2012

(65) Prior Publication Data

US 2013/0126013 A1    May 23, 2013

Related U.S. Application Data

(60) Provisional application No. 61/562,359, filed on Nov. 21, 2011.

(51) Int. Cl.
  *C01B 3/36*  (2006.01)
  *F17D 1/00*  (2006.01)
  (Continued)

(52) U.S. Cl.
  CPC . *F17D 1/00* (2013.01); *C01B 3/065* (2013.01); *H01M 8/04216* (2013.01); *Y02E 60/362* (2013.01); *Y10T 137/6416* (2015.04)

(58) Field of Classification Search
  CPC ....... Y02E 60/362; Y02E 60/36; C01B 3/065; H01M 8/065; H01M 8/04216; H01M 8/04208; F17C 11/005; B01J 7/02
  See application file for complete search history.

(56) References Cited

U.S. PATENT DOCUMENTS

| | | |
|---|---|---|
| 3,084,241 A | 4/1963 | Carrona |
| 3,262,801 A | 7/1966 | Lally et al. |
| (Continued) | | |

FOREIGN PATENT DOCUMENTS

| | | |
|---|---|---|
| CA | 2618742 | 2/2007 |
| CA | 2713022 | 8/2009 |
| (Continued) | | |

OTHER PUBLICATIONS

Amendola, S.C. et al. (2000), "A safe, portable, hydrogen gas generator using aqueous borohydride solution and Ru catalyst," International Journal of Hydrogen Energy, 25, 969-975.

(Continued)

*Primary Examiner* — Imran Akram
(74) *Attorney, Agent, or Firm* — Carr & Ferrell LLP

(57) ABSTRACT

A high energy density fuel source that reduces hydride expansion during hydrogen release, including a rigid, thermally insulated container defining an internal volume, a heater mechanism disposed within the internal volume, and a metal hydride rod thermally connected to the heater mechanism, wherein the heater mechanism and metal hydride rod substantially occupying the entirety of the internal volume. The metal hydride rod preferably includes a malleable encapsulation compressed about, thermally coupled to, and substantially encapsulating a volume of compressed metal hydride powder, the malleable encapsulation defined by a first, thermally conductive, malleable cup inverted over a second, thermally conductive, malleable cup, the compressed malleable encapsulation defining a tortuous fluid flow path from the metal hydride to the internal volume of the container.

15 Claims, 8 Drawing Sheets

(51) Int. Cl.
*H01M 8/04* (2006.01)
*C01B 3/06* (2006.01)

(56) References Cited

U.S. PATENT DOCUMENTS

| | | | |
|---|---|---|---|
| 3,692,888 A * | 9/1972 | Phillips, Jr. | 264/0.5 |
| 3,774,589 A | 11/1973 | Kober | |
| 3,884,216 A | 5/1975 | McCartney | |
| 3,895,102 A | 7/1975 | Gallagher | |
| 4,042,528 A | 8/1977 | Abe | |
| 4,261,956 A * | 4/1981 | Adlhart | 422/239 |
| 4,310,601 A * | 1/1982 | Bernauer et al. | 428/566 |
| 4,419,457 A | 12/1983 | Tokunaga | |
| 4,609,038 A * | 9/1986 | Ishikawa et al. | 165/104.12 |
| 4,827,534 A | 5/1989 | Haugen | |
| 4,846,176 A | 7/1989 | Golden | |
| 5,182,046 A | 1/1993 | Patton et al. | |
| 5,593,640 A * | 1/1997 | Long et al. | 422/111 |
| 5,702,491 A | 12/1997 | Long et al. | |
| 5,804,329 A | 9/1998 | Amendola | |
| 5,817,157 A | 10/1998 | Checketts | |
| 5,948,558 A | 9/1999 | Amendola | |
| 5,973,602 A | 10/1999 | Cole, III et al. | |
| 5,993,734 A * | 11/1999 | Snowman et al. | 419/48 |
| 6,045,575 A | 4/2000 | Rosen et al. | |
| 6,106,801 A | 8/2000 | Bogdanovic et al. | |
| 6,127,058 A | 10/2000 | Pratt et al. | |
| 6,250,078 B1 | 6/2001 | Amendola et al. | |
| 6,268,077 B1 | 7/2001 | Kelley et al. | |
| 6,268,595 B1 | 7/2001 | Haenel | |
| 6,289,888 B1 | 9/2001 | Welles | |
| 6,326,097 B1 | 12/2001 | Hockaday | |
| 6,375,638 B2 | 4/2002 | Nason et al. | |
| 6,392,313 B1 | 5/2002 | Epstein et al. | |
| 6,433,129 B1 | 8/2002 | Amendola et al. | |
| 6,455,181 B1 | 9/2002 | Hallum | |
| 6,458,478 B1 | 10/2002 | Wang et al. | |
| 6,461,752 B1 | 10/2002 | Leung | |
| 6,468,694 B1 | 10/2002 | Amendola | |
| 6,497,793 B1 | 12/2002 | Ahonen et al. | |
| 6,497,973 B1 | 12/2002 | Amendola | |
| 6,524,542 B2 | 2/2003 | Amendola et al. | |
| 6,534,033 B1 | 3/2003 | Amendola et al. | |
| 6,534,950 B2 | 3/2003 | LeBoe | |
| 6,544,400 B2 | 4/2003 | Hockaday et al. | |
| 6,544,679 B1 | 4/2003 | Petillo et al. | |
| 6,579,068 B2 | 6/2003 | Bridger et al. | |
| 6,586,563 B1 | 7/2003 | Ortega et al. | |
| 6,589,681 B1 | 7/2003 | Yamanis | |
| 6,620,542 B2 | 9/2003 | Pan | |
| 6,645,651 B2 | 11/2003 | Hockaday et al. | |
| 6,660,421 B2 | 12/2003 | Celemin et al. | |
| 6,660,685 B1 | 12/2003 | Schussler et al. | |
| 6,670,444 B2 | 12/2003 | Amendola et al. | |
| 6,683,025 B2 | 1/2004 | Amendola et al. | |
| 6,706,909 B1 | 3/2004 | Snover et al. | |
| 6,713,201 B2 | 3/2004 | Bullock et al. | |
| 6,723,072 B2 | 4/2004 | Mahoney et al. | |
| 6,745,801 B1 | 6/2004 | Cohen et al. | |
| 6,746,496 B1 | 6/2004 | Kravitz et al. | |
| 6,808,833 B2 | 10/2004 | Johnson | |
| 6,815,116 B2 | 11/2004 | Lenz et al. | |
| 6,818,334 B2 | 11/2004 | Tsang | |
| 6,821,499 B2 | 11/2004 | Jorgensen | |
| 6,821,668 B1 | 11/2004 | Perry et al. | |
| 6,823,678 B1 | 11/2004 | Li | |
| 6,828,049 B2 | 12/2004 | Bullock et al. | |
| 6,834,623 B2 | 12/2004 | Cheng | |
| 6,834,632 B2 | 12/2004 | Kataoka et al. | |
| 6,840,955 B2 | 1/2005 | Ein | |
| 6,849,351 B2 | 2/2005 | Hartnack et al. | |
| 6,887,596 B2 | 5/2005 | Leban | |
| 6,893,755 B2 | 5/2005 | Leboe | |
| 6,916,159 B2 | 7/2005 | Rush et al. | |
| 6,924,054 B2 | 8/2005 | Prasad et al. | |
| 6,932,847 B2 | 8/2005 | Amendola et al. | |
| 6,939,529 B2 | 9/2005 | Strizki et al. | |
| 7,019,105 B2 | 3/2006 | Amendola et al. | |
| 7,083,657 B2 | 8/2006 | Mohring et al. | |
| 7,105,033 B2 | 9/2006 | Strizki et al. | |
| 7,105,245 B2 | 9/2006 | Ohlsen et al. | |
| 7,108,777 B2 | 9/2006 | Xu et al. | |
| 7,214,439 B2 | 5/2007 | Ortega et al. | |
| 7,220,290 B2 | 5/2007 | Amendola et al. | |
| 7,282,073 B2 | 10/2007 | Petillo et al. | |
| 7,316,718 B2 | 1/2008 | Amendola et al. | |
| 7,316,719 B2 | 1/2008 | Devos | |
| 7,323,148 B2 | 1/2008 | Shah et al. | |
| 7,393,369 B2 | 7/2008 | Shurtleff | |
| 7,527,661 B2 | 5/2009 | Chellappa et al. | |
| 7,530,931 B2 | 5/2009 | Amendola et al. | |
| 7,540,892 B2 | 6/2009 | Strizki et al. | |
| 7,579,806 B2 | 8/2009 | Okuto | |
| 7,637,263 B2 | 12/2009 | Fisher et al. | |
| 7,645,536 B2 | 1/2010 | Akiyama et al. | |
| 7,662,435 B2 | 2/2010 | Chellappa et al. | |
| 7,666,386 B2 | 2/2010 | Withers-Kirby et al. | |
| 7,811,529 B2 | 10/2010 | Powell et al. | |
| 7,867,300 B2 | 1/2011 | Chellappa et al. | |
| 7,875,089 B2 | 1/2011 | Powell et al. | |
| 7,922,781 B2 | 4/2011 | Chellappa et al. | |
| 7,954,519 B2 | 6/2011 | Powell et al. | |
| 8,062,797 B2 | 11/2011 | Fisher et al. | |
| 8,100,993 B2 | 1/2012 | Fisher et al. | |
| 8,118,893 B2 | 2/2012 | Rosenzweig et al. | |
| 8,187,758 B2 | 5/2012 | Fisher et al. | |
| 8,192,890 B2 | 6/2012 | Fisher et al. | |
| 8,361,668 B2 | 1/2013 | Mclean et al. | |
| 8,741,004 B2 | 6/2014 | Braithwaite et al. | |
| 8,790,839 B2 | 7/2014 | Braithwaite et al. | |
| 8,795,926 B2 | 8/2014 | Braithwaite et al. | |
| 8,808,410 B2 | 8/2014 | Braithwaite et al. | |
| 8,940,458 B2 | 1/2015 | Braithwaite et al. | |
| 9,034,531 B2 | 5/2015 | Fabian et al. | |
| 2001/0045364 A1 | 11/2001 | Hockaday et al. | |
| 2002/0026226 A1 | 2/2002 | Ein | |
| 2002/0096046 A1 * | 7/2002 | Drexler et al. | 92/208 |
| 2002/0114985 A1 | 8/2002 | Shkolnik et al. | |
| 2002/0182459 A1 | 12/2002 | Hockaday et al. | |
| 2003/0009942 A1 | 1/2003 | Amendola et al. | |
| 2003/0022034 A1 | 1/2003 | Suzuki | |
| 2003/0037487 A1 | 2/2003 | Amendola et al. | |
| 2003/0049505 A1 | 3/2003 | Kameya et al. | |
| 2003/0077494 A1 | 4/2003 | Aberle et al. | |
| 2003/0082427 A1 | 5/2003 | Prasad et al. | |
| 2003/0091879 A1 | 5/2003 | Rusta-Sellehy et al. | |
| 2003/0138679 A1 | 7/2003 | Prased et al. | |
| 2003/0157389 A1 | 8/2003 | Kornmayer | |
| 2003/0198558 A1 | 10/2003 | Nason et al. | |
| 2003/0235724 A1 | 12/2003 | Ord et al. | |
| 2004/0011662 A1 | 1/2004 | Xu et al. | |
| 2004/0013923 A1 | 1/2004 | Molter et al. | |
| 2004/0018415 A1 | 1/2004 | Lai et al. | |
| 2004/0048115 A1 | 3/2004 | Devos | |
| 2004/0048132 A1 | 3/2004 | Takai et al. | |
| 2004/0048135 A1 | 3/2004 | Hartnack et al. | |
| 2004/0052704 A1 | 3/2004 | Devos | |
| 2004/0062965 A1 | 4/2004 | Morse et al. | |
| 2004/0062978 A1 | 4/2004 | Yazici | |
| 2004/0096721 A1 | 5/2004 | Ohlsen et al. | |
| 2004/0131903 A1 | 7/2004 | Shioya | |
| 2004/0136156 A1 | 7/2004 | Nakamura et al. | |
| 2004/0148857 A1 | 8/2004 | Strizki et al. | |
| 2004/0161350 A1 | 8/2004 | Yang | |
| 2004/0197214 A1 | 10/2004 | Arthur et al. | |
| 2004/0202548 A1 | 10/2004 | Dai et al. | |
| 2004/0211054 A1 | 10/2004 | Morse et al. | |
| 2004/0211189 A1 | 10/2004 | Arnold | |
| 2004/0219409 A1 | 11/2004 | Isogai | |
| 2004/0229101 A1 | 11/2004 | Davis | |
| 2004/0240198 A1 | 12/2004 | Van Laar et al. | |
| 2004/0247979 A1 | 12/2004 | Sato et al. | |
| 2004/0253500 A1 | 12/2004 | Bourilkov et al. | |
| 2005/0023236 A1 | 2/2005 | Adams et al. | |

(56) References Cited

U.S. PATENT DOCUMENTS

| | | |
|---|---|---|
| 2005/0031931 A1 | 2/2005 | Kabumoto et al. |
| 2005/0036941 A1 | 2/2005 | Bae et al. |
| 2005/0037252 A1 | 2/2005 | Pham |
| 2005/0058866 A1 | 3/2005 | Rocke et al. |
| 2005/0074641 A1 | 4/2005 | Inai et al. |
| 2005/0089415 A1 | 4/2005 | Cho et al. |
| 2005/0120621 A1 | 6/2005 | Lawson et al. |
| 2005/0158595 A1 | 7/2005 | Marsh et al. |
| 2005/0158600 A1 | 7/2005 | Mitsuishi et al. |
| 2005/0178061 A1 | 8/2005 | Tonca |
| 2005/0181250 A1 | 8/2005 | Beckmann et al. |
| 2005/0186871 A1 | 8/2005 | Hockaday |
| 2005/0196666 A1 | 9/2005 | Gottesfeld et al. |
| 2005/0238573 A1 | 10/2005 | Zhang et al. |
| 2005/0255349 A1 | 11/2005 | Fisher et al. |
| 2005/0256555 A1 | 11/2005 | Fisher et al. |
| 2005/0266285 A1 | 12/2005 | Edlund et al. |
| 2006/0059778 A1 | 3/2006 | Shurtleff et al. |
| 2006/0073365 A1 | 4/2006 | Kaye |
| 2006/0110639 A1 | 5/2006 | Walter |
| 2006/0127734 A1 | 6/2006 | McLean et al. |
| 2006/0172694 A1 | 8/2006 | Gau et al. |
| 2006/0194082 A1 | 8/2006 | Tucker et al. |
| 2006/0196112 A1 | 9/2006 | Berry et al. |
| 2006/0275645 A1 | 12/2006 | Gallagher et al. |
| 2007/0002172 A1 | 1/2007 | Calvignac et al. |
| 2007/0020172 A1* | 1/2007 | Withers-Kirby et al. .. 423/648.1 |
| 2007/0031711 A1 | 2/2007 | Miyata et al. |
| 2007/0036711 A1 | 2/2007 | Fisher et al. |
| 2007/0037034 A1 | 2/2007 | Fisher et al. |
| 2007/0042244 A1 | 2/2007 | Spallone et al. |
| 2007/0068071 A1 | 3/2007 | Kelly et al. |
| 2007/0108056 A1 | 5/2007 | Nyberg et al. |
| 2007/0120872 A1 | 5/2007 | Satoh |
| 2007/0122668 A1 | 5/2007 | Suzuki et al. |
| 2007/0160885 A1 | 7/2007 | Lee et al. |
| 2007/0166595 A1 | 7/2007 | Akiyama et al. |
| 2007/0189960 A1 | 8/2007 | Yamamoto |
| 2007/0264546 A1 | 11/2007 | LaVen |
| 2008/0025880 A1 | 1/2008 | Shurtleff et al. |
| 2008/0044691 A1 | 2/2008 | Wake et al. |
| 2008/0172932 A1 | 7/2008 | Kelly et al. |
| 2008/0176111 A1 | 7/2008 | Schaffnit et al. |
| 2008/0187798 A1 | 8/2008 | McLean et al. |
| 2008/0193804 A1 | 8/2008 | Suzuki et al. |
| 2008/0203816 A1 | 8/2008 | Fujita |
| 2008/0220297 A1 | 9/2008 | Sarata et al. |
| 2008/0256858 A1 | 10/2008 | Fuller et al. |
| 2008/0292541 A1 | 11/2008 | Kamada et al. |
| 2009/0004515 A1 | 1/2009 | Mogi et al. |
| 2009/0016216 A1 | 1/2009 | Ballard et al. |
| 2009/0060833 A1 | 3/2009 | Curello et al. |
| 2009/0087706 A1 | 4/2009 | Gil et al. |
| 2009/0092864 A1 | 4/2009 | McLean et al. |
| 2009/0117420 A1 | 5/2009 | Nakakubo |
| 2009/0197125 A1 | 8/2009 | Salvador et al. |
| 2009/0267514 A1* | 10/2009 | Snijkers-Hendrickx et al. ............ 313/634 |
| 2009/0269634 A1 | 10/2009 | Fabian et al. |
| 2009/0274595 A1 | 11/2009 | Fisher et al. |
| 2009/0304558 A1 | 12/2009 | Patton et al. |
| 2009/0305112 A1 | 12/2009 | Fisher et al. |
| 2010/0150824 A1 | 6/2010 | Withers-Kirby et al. |
| 2010/0173214 A1 | 7/2010 | Fabian et al. |
| 2010/0178573 A1* | 7/2010 | Eickhoff et al. ............. 429/421 |
| 2010/0304238 A1* | 12/2010 | Ku et al. ........................ 429/423 |
| 2010/0319534 A1 | 12/2010 | Currier et al. |
| 2010/0323254 A1 | 12/2010 | Mori et al. |
| 2010/0323258 A1 | 12/2010 | Blackburn et al. |
| 2011/0020215 A1 | 1/2011 | Ryu et al. |
| 2011/0027667 A1* | 2/2011 | Sugimoto et al. ............. 429/410 |
| 2011/0053016 A1 | 3/2011 | Braithwaite et al. |
| 2011/0070151 A1 | 3/2011 | Braithwaite et al. |
| 2011/0070509 A1 | 3/2011 | Mai |
| 2011/0147651 A1* | 6/2011 | Uesugi ..................... 252/182.32 |
| 2011/0159386 A1 | 6/2011 | Kaupert et al. |
| 2011/0200495 A1 | 8/2011 | Braithwaite et al. |
| 2011/0311895 A1 | 12/2011 | Spare et al. |
| 2011/0313589 A1 | 12/2011 | Iyer et al. |
| 2012/0100443 A1 | 4/2012 | Braithwaite et al. |
| 2012/0121996 A1 | 5/2012 | Fisher et al. |
| 2012/0189876 A1 | 7/2012 | Fabian et al. |
| 2012/0189928 A1 | 7/2012 | Braithwaite et al. |
| 2012/0282535 A1 | 11/2012 | Fabian et al. |
| 2013/0078544 A1 | 3/2013 | Braithwaite et al. |
| 2013/0147276 A1 | 6/2013 | Yamamoto et al. |
| 2013/0149620 A1 | 6/2013 | Fabian et al. |
| 2013/0149626 A1 | 6/2013 | Braithwaite et al. |
| 2013/0196243 A1 | 8/2013 | Braithwaite et al. |
| 2013/0224611 A1 | 8/2013 | Fabian et al. |
| 2013/0224614 A1 | 8/2013 | Fabian et al. |
| 2015/0214562 A1 | 7/2015 | Fabian et al. |

FOREIGN PATENT DOCUMENTS

| | | |
|---|---|---|
| CN | 101443943 | 5/2009 |
| CN | 101971402 | 2/2011 |
| DE | 3410305 | 9/1985 |
| DE | 4221492 | 1/1993 |
| DE | 10148821 | 4/2003 |
| EP | 1001666 | 5/2000 |
| EP | 1434292 | 6/2004 |
| EP | 1467096 | 10/2004 |
| EP | 1469545 | 10/2004 |
| EP | 1527919 | 5/2005 |
| EP | 1746957 | 1/2007 |
| EP | 1756903 | 2/2007 |
| EP | 1922285 | 5/2008 |
| EP | 1938410 | 7/2008 |
| EP | 2248213 | 11/2010 |
| EP | 2789073 | 10/2014 |
| FR | 2823047 | 10/2002 |
| JP | H02-234358 | 9/1990 |
| JP | 2001238903 | 9/2001 |
| JP | 2002017921 | 1/2002 |
| JP | 2002161410 | 6/2002 |
| JP | 2002294505 | 10/2002 |
| JP | 2002373682 | 12/2002 |
| JP | 3093544 | 5/2003 |
| JP | 2004071471 | 3/2004 |
| JP | 2004362805 | 12/2004 |
| JP | 2005126877 | 5/2005 |
| JP | 2005332648 | 12/2005 |
| JP | 2006079891 | 3/2006 |
| JP | 2007157587 | 6/2007 |
| JP | 2007536015 | 12/2007 |
| JP | 2007536711 | 12/2007 |
| JP | 2009504555 | 2/2009 |
| JP | 2009505357 | 2/2009 |
| JP | 2011511416 | 4/2011 |
| JP | 2014546175 | 4/2014 |
| KR | 1020080071118 | 8/2008 |
| KR | 1020140101845 | 8/2014 |
| WO | WO9516948 | 6/1995 |
| WO | WO0012889 | 3/2000 |
| WO | WO02097911 | 12/2002 |
| WO | WO03031874 | 4/2003 |
| WO | WO2004001235 | 12/2003 |
| WO | WO2005049485 | 6/2005 |
| WO | WO2005057703 | 6/2005 |
| WO | WO2005110299 | 11/2005 |
| WO | WO2005112179 | 11/2005 |
| WO | WO2005123586 | 12/2005 |

OTHER PUBLICATIONS

International Search Report and Written Opinion mailed Nov. 28, 2006 in Patent Cooperation Treaty Application No. PCT/US2005/016256, filed May 6, 2005.

International Search Report and Written Opinion mailed Oct. 3, 2006 in Patent Cooperation Treaty Application No. PCT/US2005/015953, filed May 6, 2005.

Supplementary European Search Report mailed Feb. 26, 2009 in European Application No. 05746718.5, filed May 6, 2005.

(56) References Cited

OTHER PUBLICATIONS

International Search Report and Written Opinion mailed Apr. 14, 2009 in Patent Cooperation Treaty Application No. PCT/US2009/000642, filed Jan. 29, 2009.
Supplementary European Search Report mailed Feb. 26, 2009 in European Application No. 05745146.0, filed May 6, 2005.
International Search Report and Written Opinion mailed Jun. 23, 2008 in Patent Cooperation Treaty Application No. PCT/US2006/031361, filed Aug. 11, 2006.
First Office Action mailed Jan. 7, 2013 in Chinese Application No. 200980103800.3, filed Jan. 29, 2009.
Second Office Action mailed Sep. 10, 2013 in Chinese Application No. 200980103800.3, filed Jan. 29, 2009.
Laser, D.J. and Santiago, J.G., "A Review of Micropumps," J. Micromech. Microeng.; vol. 14 (2004) R35-R64.
Wu, Ying "Hydrogen Storage via Sodium Borohydride: Current Status, Barriers & R&D Roadmap," Presentation presented at GCEP, Stanford University, Apr. 14-15, 2003.
Definition of course work technical terms. Southwest Tech, 2002-2006. Retrieved on Feb. 8, 2012. Retrieved from the Internet URL: <http://www.swtc.edu/Ag_Power/hydraulics/terms.htm>.
Schlesinger et al., "Sodium Borohydride, Its Hydrolysis and its Use as a Reducing Agent and in the Generation of Hydrogen," J. Am. Chem. Soc; vol. 75 (Mar. 15, 1952), pp. 215-219.
International Search Report and Written Opinion mailed Apr. 29, 2011 in Patent Cooperation Treaty application No. PCT/US2010/002022, filed Jul. 16, 2010.
International Search Report and Written Opinion mailed May 2, 2013 in Patent Cooperation Treaty Application No. PCT/US2013/027927, filed Feb. 27, 2013.
Office Action mailed May 21, 2013 in Japanese Patent Application No. 2010-545027, filed Jan. 29, 2009.
Examination Report mailed Nov. 13, 2012 in European Patent Application No. 09705894.5, filed Jan. 29, 2009.
Extended European Search Report mailed Feb. 19, 2010 in European Application No. 06813380.0, filed Aug. 11, 2006.
Extended European Search Report mailed Nov. 19, 2009 in European Application No. 06801246.7, filed Aug. 11, 2006.
International Search Report and Written Opinion mailed Apr. 27, 2011 in Patent Cooperation Treaty Application No. PCT/US2010/002313, filed Aug. 20, 2010.
International Search Report and Written Opinion mailed May 20, 2009 in Patent Cooperation Treaty Application No. PCT/US2009/000648, filed Jan. 29, 2009.
International Search Report and Written Opinion mailed Jun. 3, 2008 in Patent Cooperation Treaty Application No. PCT/US2006/031377, filed Aug. 11, 2006.
International Search Report and Written Opinion mailed Feb. 21, 2012 in Patent Cooperation Treaty Application No. PCT/US2011/058652, filed Oct. 31, 2011.
International Search Report and Written Opinion mailed Mar. 19, 2012 in Patent Cooperation Treaty Application No. PCT/US2011/058665, filed Oct. 31, 2011.
International Search Report and Written Opinion mailed Feb. 14, 2012 in Patent Cooperation Treaty Application No. PCT/US2011/057181, filed Oct. 20, 2011.
International Search Report and Written Opinion mailed Feb. 21, 2012 in Patent Cooperation Treaty Application No. PCT/US2011/058662, filed Oct. 31, 2011.
International Search Report and Written Opinion mailed Feb. 22, 2013 in Patent Cooperation Treaty Application No. PCT/US2012/068775, filed Dec. 10, 2012.
Office Action mailed Oct. 27, 2009 in Japanese Patent Application No. 2007-511660, filed May 6, 2005.
First Office Action mailed Jun. 7, 2010 in Chinese Patent Application No. 200680037868.2, filed Aug. 11, 2006.
Second Office Action mailed Mar. 30, 2011 in Chinese Patent Application No. 200680037868.2, filed Aug. 11, 2006.

* cited by examiner

METHOD OF MANUFACTURE OF A METAL HYDRIDE FUEL SUPPLY

CROSS-REFERENCE TO RELATED APPLICATIONS

This application claims the benefit of U.S. Provisional Application No. 61/562,359 filed 21 Nov. 2011, which is incorporated in its entirety by this reference.

TECHNICAL FIELD

This invention relates generally to the fuel cell field, and more specifically to a new and useful fuel storage mechanism in the fuel cell field.

BACKGROUND

Fuel cell systems provide a good alternative to fossil fuels as an energy source due to the renewable nature of the fuel and the low carbon footprint of energy production. Fuel cell systems typically include a fuel cell arrangement, which converts a fuel into electricity, and a fuel supply, which supplies fuel to the fuel cell arrangement. The primary consideration for the success of these fuel supplies is the energy density of the fuel supply, or the amount of fuel that can be stored per unit volume.

Of the plurality of fuel supply options available, metal hydride sources stand out as a volumetrically efficient means of storing fuel. This is due to the way fuel is stored—the metal hydride sources store fuel in a chemically bound form, which allows for higher energy densities than pressurized, gaseous fuel. However, metal hydrides expand during fuel release. Conventional fuel supplies that leverage metal hydrides accommodate for this expansion by leaving extra room within the fuel source. Unfortunately, this leads to a lower overall energy density for the fuel source.

Thus, there is a need in the fuel cell field to create a new and useful fuel source that reduces metal hydride expansion during fuel release.

DESCRIPTION OF THE PREFERRED EMBODIMENTS

The following description of the preferred embodiments of the invention is not intended to limit the invention to these preferred embodiments, but rather to enable any person skilled in the art to make and use this invention.

1. High Energy Density Fuel Source

Figure 1:
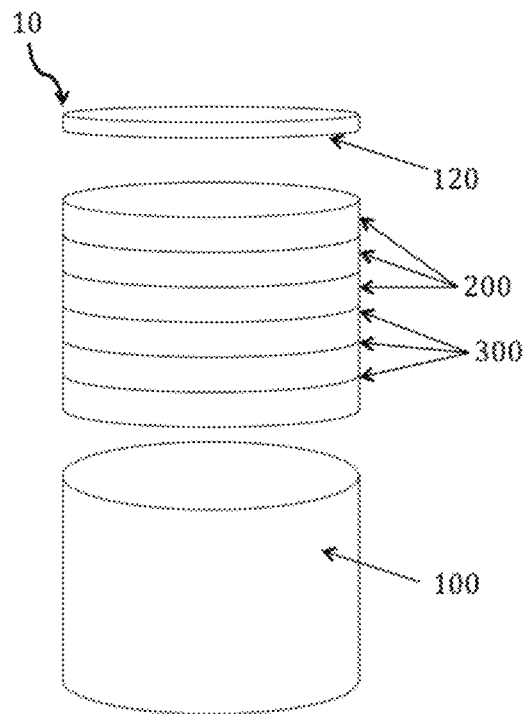
FIG. 1 is an exploded view of a variation of the fuel source.
Figure 2:
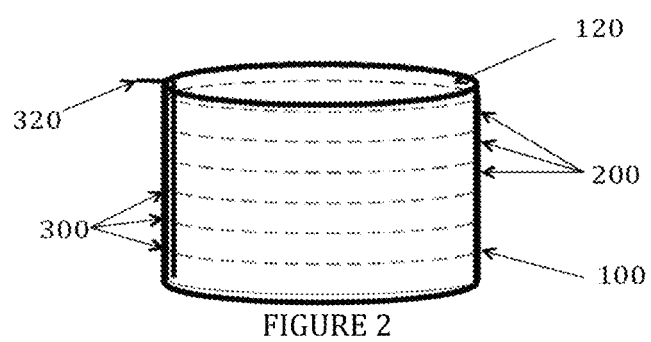
FIG. 2 is a perspective view of a variation of the fuel source.

As shown in FIG. 1, the fuel source 10 preferably includes a container 100 containing a reaction mechanism 300 and an encapsulated metal hydride pellet 200. More preferably, the fuel source 10 includes a rigid container 100 containing a plurality of encapsulated metal hydride pellets 200 alternating with a plurality of reaction mechanisms 300, wherein the metal hydride pellets 200 and reaction mechanisms 300 cooperatively occupy substantially the whole of an internal volume defined by the container 100, as shown in FIG. 2. The encapsulated metal hydride pellet 200 preferably includes a malleable receptacle 220 encapsulating a volume of compressed metal hydride powder. Utilization of an encapsulated metal hydride pellet 200 confers the unexpected benefit of reducing pellet expansion during fuel release. Encapsulation of the metal hydride pellet can additionally confer the benefit of reducing metal hydride powder loss during metal hydride manufacture, particularly when the encapsulation functions as a carrier during metal hydride pellet production.

The cartridge is preferably utilized with a fuel generator, wherein the fuel source 10 is coupled to the fuel generator. The fuel generator preferably initiates and controls reaction of the metal hydride 240 within the fuel source 10 to release fuel, wherein the fuel preferably egresses from the cartridge into a fuel cell arrangement, wherein the fuel cell arrangement preferably converts the fuel into electric power. Fuel generation is preferably actively controlled by the fuel generator, but can alternatively be passively controlled. The metal hydride 240 preferably produces fuel through thermolysis, wherein the fuel generator powers the reaction mechanism 300 to generate heat. However, the metal hydride 240 can alternatively produce fuel through hydrolysis, wherein the fuel generator initiates reagent flow from a reagent reservoir to the metal hydride 240, or produce fuel through any suitable mechanism.

In operation, the metal hydride 240 preferably releases fuel into the interior volume through one or more tortuous fluid paths defined by the encapsulation, wherein a fuel outlet subsequently directs fuel from the interior volume out of the fuel source 10. The fuel outlet can alternatively extend through the encapsulation to directly fluidly connect the metal hydride 240 to the fuel source 10 exterior. However, any suitable fuel flow path from the metal hydride 240 to the fuel source 10 exterior can be used. The pressure of the generated fuel preferably facilitates fuel flow out of the fuel source 10, but fuel flow can alternatively be facilitated by pumps or any other suitable mechanism.

The container 100 of the fuel source 10 functions to encapsulate and mechanically protect the metal hydride pellet. The container 100 preferably additionally includes a cap 120, wherein the cap 120 preferably seals an end of the container 100 to retain the metal hydride pellet and reaction mechanism 300 within the container 100. The container 100 preferably includes one cap, wherein the container 100 includes an open end and a closed end opposing the open end, but can alternatively include two caps, wherein the container 100 includes longitudinal walls defining two opposing open ends, or no caps, wherein the container 100 is preferably formed around the contents of the container 100. An interior volume is preferably defined between the container 100 and the cap 120, wherein the metal hydride pellet and reaction mechanism 300 preferably substantially fill the interior volume. Furthermore, the one or more caps can additionally apply a compressive force to the contents of the cartridge when coupled to the casing, wherein the caps can additionally include compression members, such as springs, compressive foam, dampers, or any other suitable compression member.

The container 100 or casing is preferably substantially rigid, but can alternatively be deformable. The container 100 is preferably thermally insulated, such that the container interior is thermally insulated from the container 100 exterior, but can alternatively be thermally conductive, or be operable between a thermally insulated mode and a thermally conductive mode. Alternatively, portions of the container 100 can be thermally conductive while other portions are thermally insulated (e.g., the end of the casing is insulated while the lengthwise surfaces are thermally conductive). The thermally insulated container 100 preferably includes a container 100 with vacuum-sealed walls, which can additionally include a vacuum-sealed end. Alternatively, the container 100 can be made of thermally insulative material, be coated by thermally insulative material, or be otherwise thermally insulated. The container 100 can be made of metal (e.g., aluminum, copper, steel, etc.), polymer, ceramic, or any suitable material or combination thereof.

The cap 120 is preferably substantially rigid, but can alternatively be deformable. The cap 120 is preferably thermally insulated, but can alternatively be made of thermally non-conductive material (e.g., plastic or ceramic), or be thermally conductive. The cap 120 preferably forms a substantially fluid impermeable seal with the container 100. The cap 120 preferably couples to the container interior surface with an interference fit, wherein the cap 120 preferably has an outer profile substantially similar to the profile of the container interior. The cap 120 can alternatively couple to the container 100 exterior surface with an interference fit, or be bolted, screwed, adhered, clipped, or otherwise sealed to the container 100. The interface between the cap 120 and container 100 can additionally include one or more O-rings or gaskets to facilitate a fluid impermeable seal.

The container 100 preferably additionally includes a fuel outlet that fluidly couples the interior volume of the container 100 to the exterior of the container 100. The fuel outlet preferably extends through the thickness of the cap 120, but can alternatively extend through the container wall, through the cap-container interface, or through any suitable portion of the container 100. The fuel outlet preferably includes a channel defined by the material of the cap 120 or container 100, but can alternatively include a tube that extends into the interior volume and/or external the container 100. The fuel outlet preferably includes a valve (e.g., an active or passive one-way or multi-path valve) that controls fuel flow out of the container 100, but can alternatively not include a valve. The valve is preferably a one-way valve that functions to vent high-pressure fuel, wherein the valve is in an open configuration when the pressure within the interior volume is higher than the ambient pressure, and in a closed configuration when the interior pressure is substantially in equilibrium with ambient. Alternatively, the valve can function in the open configuration when the interior pressure exceeds a threshold pressure or when the valve is articulated by the fuel generator, and in a closed configuration otherwise. However, any other suitable valve configuration can be used. The valve preferably includes a particle filter that prevents egress of fuel storage composition particles from cartridge. The filter is preferably chosen from materials that can withstand the cartridge environment pressure, temperature and will not contaminate the fuel stream, e.g., porous ceramics, open cell metal foam, etched metal screens.

The container 100 preferably additionally includes a reaction mechanism connection 320 that facilitates fuel generator control over the reaction mechanism 300. The reaction mechanism connection 320 preferably extends through the cap 120, but can alternatively extend through the container wall, through the container 100-cap interface, or through any suitable portion of the container 100. The reaction mechanism connection 320 preferably includes an electrical connection that facilitates electrical power transfer, but can alternatively include a mechanical connection that facilitates mechanical power transfer or motion transfer, a magnetic connection, or any other suitable connection between the fuel generator and the reaction mechanism 300 contained within the interior volume. The reaction mechanism connection 320 can additionally include one or more data connections, which function to transfer data, such as sensor measurements or control data, between the fuel generator and components within the interior volume.

The container 100 can additionally include a memory element and an information couple that allows the fuel generator to access and modify the content of the memory element. The memory element preferably stores information about the starting and current fuel capacity of the cartridge, the cartridge manufacturer, the cartridge operational conditions, cartridge rating, or any other suitable cartridge identifier or parameter. The memory element is preferably a high temperature integrated circuit memory, but can be any other suitable memory element, such as a resistive, capacitive, magnetic, or optical memory. The information on the memory element can be encoded or can be discernible by human eye (e.g., the cartridge state of charge information represented as a count of marks on the outside of the container 100, the color of different portions of the fuel storage composition, etc.).

The encapsulated metal hydride pellet 200 functions to store and release fuel. The encapsulated metal hydride 240 preferably includes an encapsulation surrounding a volume of compressed metal hydride powder. The encapsulated metal hydride pellet 200 can additionally include the reaction mechanism 300, wherein the reaction mechanism 300 can be encapsulated by the encapsulation. The encapsulated metal hydride pellet 200 is preferably a substantially flat disc with a circular circumference terminating in two substantially planar, parallel ends. However, the pellet profile can alternatively be rectangular, triangular, or have any suitable shape. The pellet profile is preferably substantially the same or smaller than the interior profile of the container 100, but can alternatively have any suitable profile. The pellet is preferably symmetric, but can alternatively be asymmetric, wherein the asymmetry preferably functions to align the pellets during insertion into the cartridge. When a plurality of pellets is included within the fuel source 10, the pellets are preferably substantially identical, but can alternatively be substantially dissimilar.

The metal hydride powder 242 preferably stores hydrogen, but can alternatively store methane, propane, or any suitable fuel; the fuel is preferably gaseous, but can alternatively be solid, liquid, or be in any other phase. The metal hydride 240 preferably thermolyses to produce fuel, but can alternatively be hydrolyzed, catalyzed, or reacted in any other suitable manner to release fuel. The metal hydride 240 is preferably supplied as a powder 242, but can alternatively be processed (e.g., ground) into a powder, compressed then re-processed into a powder 242 (e.g., to control particle size and pellet uniformity), or produced in any suitable manner. The powder particle size is preferably selected for optimal metal hydride reaction, but can alternatively be selected for optimal volume reduction during pellet formation, optimal uniformity after pellet formation, or for any other parameter. The powder 242 is preferably on the order of microns (e.g., 1000 μm, 100 μm, 10 μm, etc.), but can alternatively be on the order of nanometers. The metal hydride 240 is preferably a hydrogen storage composition (a chemical composition that chemically stores a high density of hydrogen), but can alternatively be any suitable fuel storage composition. The metal hydride 240 is preferably aluminum hydride (Mane), more preferably the α-Alane polymorph, but alternatively any suitable polymorph (e.g., β-Alane, γ-Alane, etc.). Aluminum hydride thermolyses to produce hydrogen and aluminum. Alternatively, the metal hydride 24o can be sodium borohydride, lithium borohydride, or any other suitable hydride or chemical composition. The metal hydride powder composition preferably includes only metal hydride 240 and any environmental contaminants, but can additionally include binders, stabilizers, catalyst particles, thermally conductive particles, or any other suitable additive that can facilitate increased form retention, pellet strength, reactivity, reactivity uniformity, or any other suitable parameter.

The pellet of compressed metal hydride powder 200 preferably has a substantially similar crystalline structure and/or polymorph as the loose metal hydride powder 242, but can alternatively have a different crystalline structure and/or polymorph. The compressed metal hydride powder density is preferably substantially uniform throughout the pellet 200, but can alternatively vary over different portions of the pellet 200 or across batches. The pellet density is preferably selected for optimal metal hydride 240 reaction response, but can alternatively be selected for material properties (e.g., resistivity, porosity, etc.) or for any suitable parameter.

The encapsulation of the encapsulated metal hydride pellet 200 functions to retain the shape of the metal hydride powder 242 within the container 100, and can additionally increase the mechanical strength of the pellet 200. The encapsulation can additionally function to couple the reaction mechanism 300 to the metal hydride 240. More preferably, the encapsulation functions to transfer the heat produced by the reaction mechanism 300 to the metal hydride 240. The encapsulation can additionally function to define a fuel flow path from the metal hydride 240 to the interior volume of the container 100. The encapsulation can additionally function to retain the metal hydride powder 242 during pellet formation. The encapsulation can additionally function to restrain the metal hydride 240 from expansion during fuel release. The encapsulation is preferably deformable, more preferably malleable, but can alternatively be substantially rigid. The encapsulation is preferably strong enough to withstand the stress, strain, temperature, and other conditions of compression. However, the encapsulation could be substantially brittle, porous, or have any other property, particularly when the encapsulation is applied to the metal hydride pellet 200 after pellet formation. The encapsulation is preferably thermally conductive and substantially inert to the metal hydride powder 242. However, the encapsulation can alternatively include an interior catalyst coating or any other suitable reaction-promoting mechanisms. The encapsulation material is preferably a reaction product of the metal hydride 240, and is more preferably metal foil (e.g., aluminum foil, copper foil, steel, etc.), but can alternatively be paper, Teflon, ePTFE, or any other suitable deformable material. The encapsulation material is preferably thin enough to be deformed and to permit substantial thermal transfer therethrough, but can alternatively be substantially thick, or have any other suitable configuration. In one variation, the encapsulation is made from aluminum foil having a thickness of less than 0.2 mM, but can alternatively be thicker or thinner.

The encapsulation preferably includes two nested receptacles (220A and 220B), but can alternatively include a single receptacle 220 with a cap, two nested receptacles 220 with a cap substantially sealing the interior receptacle 220, an encapsulation extruded or coated over the metal hydride 240, or any other suitable encapsulation with any other suitable form factor or configuration. Alternatively, the encapsulation can be made from the reaction mechanism 300 or made from any other suitable component of the fuel source 10. When one or more receptacles 220 are utilized, the metal hydride powder 242 is preferably deposited into the receptacle 220, sealed within the receptacle 220, and compressed into a pellet 200 within the receptacle 220. Alternatively, the metal hydride pellet 200 can be contained within the encapsulation after metal hydride pellet formation.

The receptacle 220 is preferably a right cylinder with an open end and an opposing closed end, but can alternatively be a right cube with an open end, be a rounded cup, have flared walls, or have any other suitable geometry. The receptacle 220 is preferably a substantially continuous piece of material, wherein the receptacle 220 is stamped, molded, or otherwise manufactured as a singular piece. Alternatively, the receptacle 220 can be formed from a folded sheet (e.g., wherein the closed end is formed from a folded edge of the sheet, the walls of the receptacle 220 are formed from the edges of the sheet, etc.), formed from multiple sheets, or formed in any other suitable manner. In the latter case, the gaps between the folds can define the fluid flow path between the metal hydride 240 and the interior volume. However, the encapsulation can alternatively be a coating applied over the metal hydride pellet 200, or any other suitable encapsulation.

Figure 3:
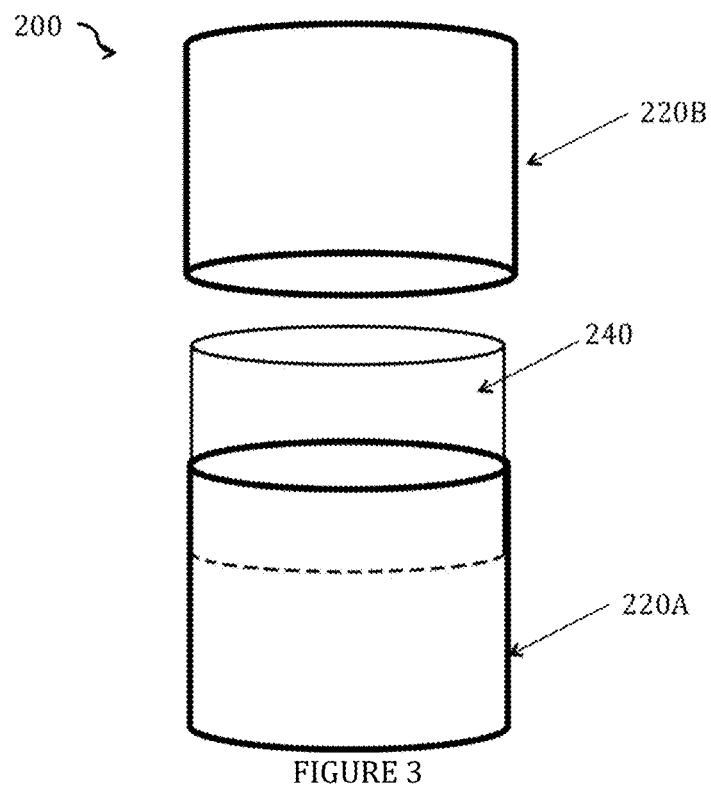
FIG. 3 is an exploded view of a first variation of the encapsulated metal hydride pellet.

In a first variation, as shown in FIG. 3, the encapsulated metal hydride pellet 200 includes a nested first and second receptacles, 220A and 220B respectively, encapsulating a volume of metal hydride powder 240. More preferably, the encapsulated metal hydride pellet 200 includes a nested first and second malleable receptacles 220A and 220B compressed about the volume of metal hydride powder 240, wherein compression of the first and second malleable receptacles 220A and 220B about the metal hydride powder 240 preferably compacts the metal hydride powder 240 into a substantially cohesive block. The first and second receptacles 220A and 220B are preferably nested with second receptacle 220B over the first receptacle 220A, wherein the first receptacle 220A receives the loose or compacted metal hydride powder 240. The open end of the second receptacle 220B is preferably folded over the closed end of the first receptacle 220A, wherein the walls of the first and second receptacles 220A and 220B and the folded end of the second receptacle 220B cooperatively define one or more tortuous flow paths between the metal hydride powder 240 and the encapsulated metal hydride pellet exterior. Alternatively, the second receptacle 220B can be nested inside the first receptacle 220A. The first and second receptacles 220A and 220B are preferably nested with the open end of the second receptacle 220B over the first receptacle 220A, such that the metal hydride powder 240 is contained within both interior volumes defined by the first and second receptacles 220A and 220B, wherein the open end of the second receptacle 220B is proximal the closed end of the first receptacle 220A and the closed end of the second receptacle 220B is distal the closed end of the first receptacle 220A (e.g., the second receptacle 220B is inverted over the first receptacle 220A). However, the closed end of the second receptacle 220B can be nested within the open end of the first receptacle 220A, such that the metal hydride powder 240 is contained between the interior volume of the first receptacle 220A and the exterior surface of the second receptacle end. However, the receptacles 220A and 220B can be nested in any suitable manner. The second receptacle 220B preferably has a slightly larger cross section (e.g., diameter) than the first receptacle 220A, but can alternatively have substantially the same or smaller cross section and nest within the first receptacle 220A. The first receptacle 220A preferably has taller walls than the second receptacle 220B, but the first and second receptacles 220 can alternatively have substantially similar wall heights, or the second receptacle 220B can have taller walls than the first receptacle 220A. The receptacles 220A and 220B are preferably made from the same material, but can alternatively include different materials.

Figure 4:
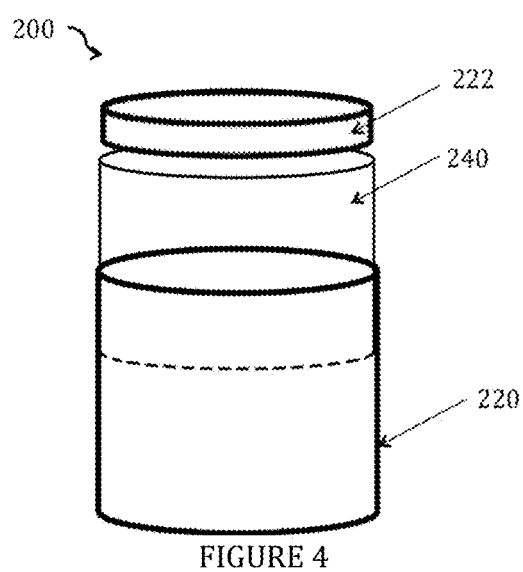
FIG. 4 is an exploded view of a second variation of the encapsulated metal hydride pellet.

In another variation of the encapsulated metal hydride pellet 200, as shown in FIG. 4, the encapsulated metal hydride pellet 200 includes a receptacle 220 with a pellet cap 222, nested within the open end of the receptacle 220. The pellet cap 222 is preferably of substantially the same material as that of the receptacle 220, but can alternatively be made of a different material, made of the reaction mechanism 300 or a portion thereof, or from any suitable material or component. The pellet cap 222 is preferably configured substantially similarly to the receptacle 220, wherein the pellet cap 222 preferably has a slightly smaller perimeter than the inner perimeter of the receptacle 220, and substantially shorter walls. However, the cap can have a slightly larger perimeter than the outer perimeter of the receptacle 220, wherein the cap nests over the receptacle 220. Alternatively, the cap can be substantially planar with a profile slightly smaller than the inner perimeter of the receptacle 220, or have any other suitable configuration. The walls defining the open end of the receptacle 220 are preferably folded over the pellet cap broad face to substantially retain the metal hydride powder 240 within the encapsulation, but the pellet cap 222 walls can alternatively be folded over the open end of the receptacle 220 to substantially retain the metal hydride powder 240. The folded walls preferably define the fluid path between the metal hydride powder 240 and the pellet exterior.

Figure 5:
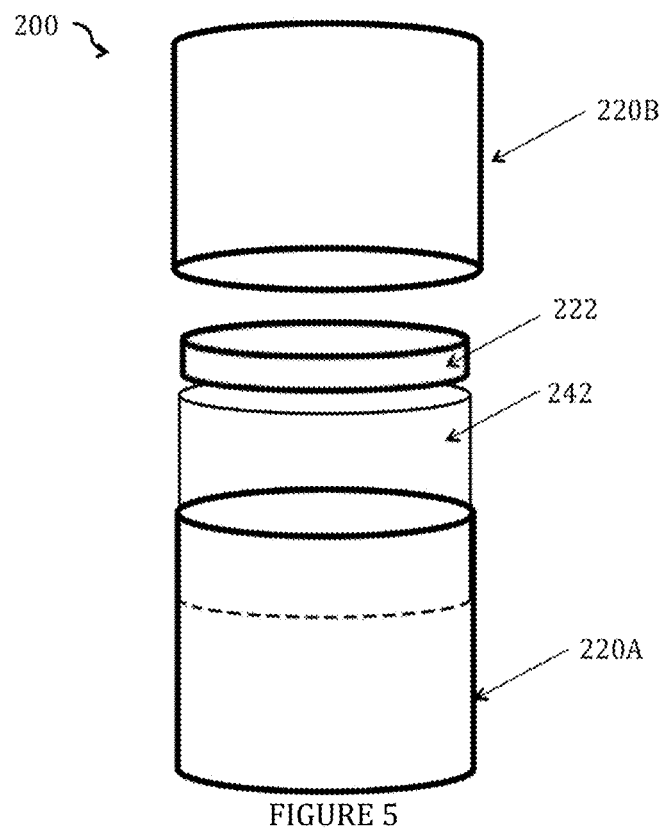
FIG. 5 is an exploded view of a third variation of the encapsulated metal hydride pellet.

In another variation of the encapsulated metal hydride pellet 200, as shown in FIG. 5, the encapsulated metal hydride pellet 200 includes a nested first and second receptacles 220A and 220B with a pellet cap 222, wherein the pellet cap 222 preferably substantially retains metal hydride powder 242 within the receptacle 220A or 220B carrying the metal hydride powder 242 and is encapsulated between the closed ends of the first and second receptacles 220A and 22B. The pellet cap 222, walls of the first and second receptacles 220A and 220B, and folded open end of the outer receptacle 220A or 220B preferably cooperatively define one or more fluid flow paths connecting the metal hydride powder 242 with the pellet exterior.

The reaction mechanism 300 of the fuel source 10 functions to provide a reactant to the metal hydride 240. The reactant is preferably heat, but can alternatively be a catalyst, a fluid reactant, a solid reactant, or any other suitable reactant. The fuel source 10 preferably includes a plurality of reaction mechanisms 300, but can alternatively only include one or two reaction mechanisms 300. The reaction mechanism 300 preferably contacts the encapsulated metal hydride pellet 200, and is preferably sandwiched between two adjacent encapsulated metal hydride pellets 200. Alternatively, the reaction mechanism 300 can define a side of the metal hydride pellet. However, the reaction mechanism 300 can be packaged within the encapsulation along with the metal hydride 240. In one variation, the reaction mechanism 300 is preferably substantially planar, but can alternatively have any suitable configuration. The planar reaction mechanism 300 is preferably arranged with a broad face substantially parallel to an end of an encapsulated metal hydride pellet 200, but can alternatively be arranged with a broad face parallel the longitudinal axis of the hydride pellet (e.g., contact the arcuate surface of the pellet between the pellet and the container wall, extend through the longitudinal axis of the pellet, etc.), or arranged in any suitable manner. The reaction mechanism 300 is preferably arranged within the container 100 with a broad face parallel to the container end. The reaction mechanisms 300 are preferably placed between the two adjacent pellets, but the metal hydride pellets can alternatively be formed around the reaction mechanisms 300 or two adjacent reaction mechanisms 300 can define a metal hydride pellet between them. The reaction mechanism 300 is preferably substantially thin to reduce the volume occupied by the reaction mechanism 300, and is preferably flexible. However, the reaction mechanism 300 can be thick and/or rigid. The reaction mechanism 300 is preferably circular, but can alternatively be a strip, be tubular, or have any suitable form factor. The reaction mechanism 300 preferably has a diameter substantially similar to the inner diameter of the fuel source 10, but can alternatively be smaller or larger. The reaction mechanism 300 is preferably a heating element, more preferably a resistive heating element, but can alternatively be a thermally conductive element (e.g., a wire or plate), a wick, a tube, or any suitable reaction mechanism 300.

Figure 6:
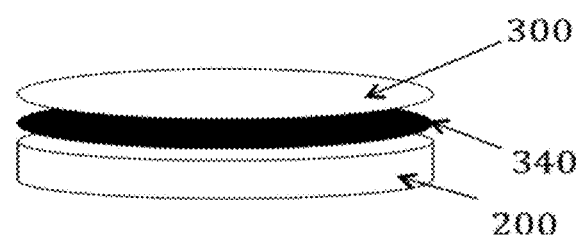
FIG. 6 is an exploded view of the interface between a heating mechanism and the encapsulated metal hydride pellet.

In one variation, the reaction mechanism 300 is a flexible resistive heater printed on a flexible substrate, wherein the heater is substantially planar, and includes a flexible, planar power strip 320 that extends along the longitudinal axis of the fuel source 10 to couple to a power source outside the fuel source 10. The fuel source 10 includes a plurality of the reaction mechanisms 300, wherein each reaction mechanism 300 is encapsulated with a metal hydride pellet within an encapsulation mechanism. In this variation, as shown in FIG. 6, the reaction mechanism 300 preferably further includes a thermal interface 340 between the encapsulated metal hydride pellet 200 and the reaction mechanism 300, wherein the thermal interface 340 can include metal hydride powder, a metal hydride paste, thermal grease, or any other suitable thermal interface 340. Alternatively, the reaction mechanism 300 can be a liquid reagent dispenser fluidly coupled to a liquid reagent reservoir and driven by a pump, a catalyst bed, or any other mechanism that facilitates fuel release from the metal hydride.

Figure 7:
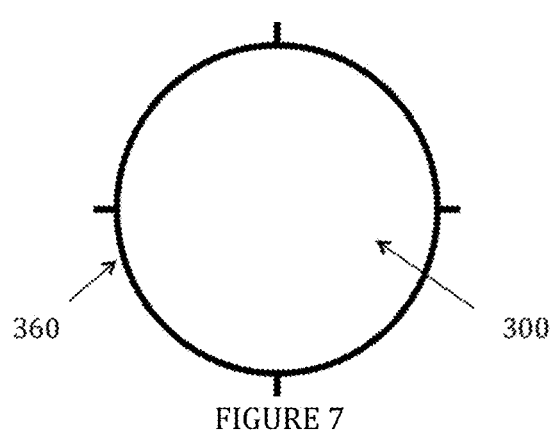
FIG. 7 is a schematic representation of the positioning ring with the reaction mechanism.

As shown in FIG. 7, the reaction mechanism 300 can additionally be coupled to a positioning ring 360 that functions to retain the reaction mechanism position within the fuel source 10. The positioning ring 360 is preferably utilized when the metal hydride pellet is formed within the container 100, but can be utilized when the metal hydride pellet is formed independent of the container 100. The positioning ring 360 preferably retains the reaction mechanism position until pellet formation, but can alternatively retain the reaction mechanism position permanently. The positioning ring 360 preferably couples to the circumference of the reaction mechanism 300, but can alternatively couple to a broad surface or any suitable portion of the reaction mechanism 300. The positioning ring 360 preferably includes two components that sandwich the reaction mechanism 300 in between, but can alternatively be a single component with a slot that the reaction mechanism 300 slides into, or have any other suitable form factor. The positioning ring 360 can include casing-coupling mechanisms, such as spring-loaded prongs (wherein the spring force can be provided by springs or as a material property of the material), be dimensioned to interference fit with the casing, have features complimentary to longitudinal grooves within the casing interior, or have any suitable casing coupling mechanism. The positioning ring 360 is preferably formed from a polymer that mechanically fails or disintegrates under the pellet formation conditions, but can alternatively be formed form a polymer that withstands pellet formation, or from a metal (preferably a thermally conductive metal, alternatively a catalyst, a reaction product of the metal hydride 240, or any suitable metal).

2. Method of Manufacturing

Figure 8:
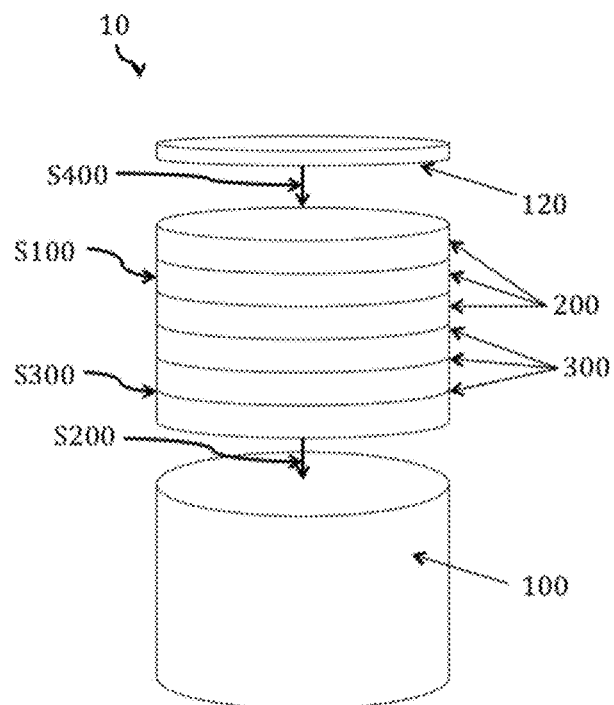
FIG. 8 is a schematic representation of the method of manufacturing a fuel source.

As shown in FIG. 8, the method of manufacturing a fuel source that reduces metal hydride expansion during fuel generation includes manufacturing an encapsulated metal hydride pellet S100, introducing the encapsulated metal hydride pellet into a container S200, coupling the reaction mechanism with the encapsulated metal hydride pellet S300, and enclosing the pellet and reaction mechanism within the container S200 with cap S400. The method for manufacturing a fuel source preferably produces a fuel source substantially similar to that described above, but can alternatively form any suitable cartridge enclosing a volume of encapsulated metal hydride. The method is preferably automated and performed by one or more automated machines controlled by one or more processors, but may alternatively be all or partially manual (e.g., performed by a worker).

Figure 9:
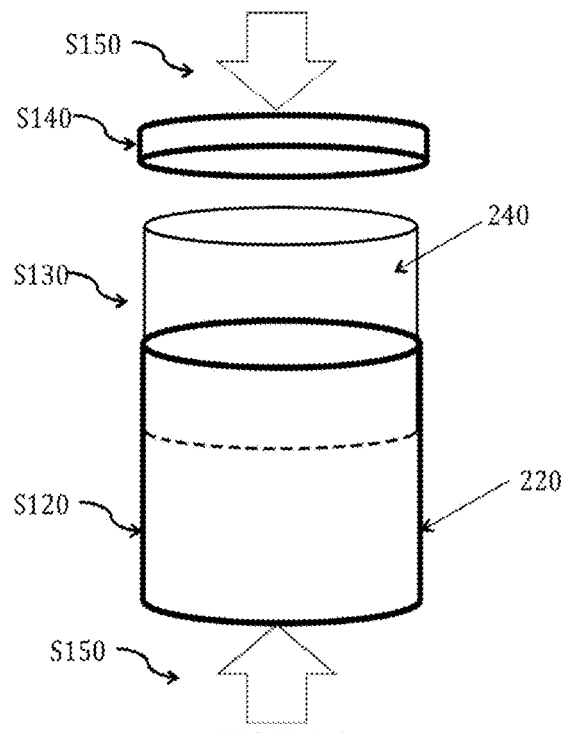
FIG. 9 is a schematic representation of the method of manufacturing an encapsulated metal hydride pellet.

Manufacturing an encapsulated metal hydride pellet S100 functions to control the mass of metal hydride enclosed within the fuel source. This step can additionally function to control the form factor, crystal structure, or any other suitable property of the pellet. As shown in FIG. 9, manufacturing the encapsulated metal hydride pellet preferably includes providing a repository S120, depositing metal hydride into the repository S130, encapsulating the metal hydride within the repository by blocking the open end of the repository S140, and applying a compressive force to the closed and blocked ends of the repository S150 to compress the metal hydride powder into a substantially coherent block and to compress the repository about the metal hydride powder. Alternatively, manufacturing the encapsulated metal hydride pellet can include providing a cohesive metal hydride block and applying an encapsulation about the block. The metal hydride pellet can be compressed from powder, extruded, sintered, crystallized out of solution, or otherwise formed. Fuel (e.g., hydrogen) can be adsorbed or chemically bound by the metal hydride prior to or post block formation. Applying an encapsulation about the block can include dip coating the block, forming (e.g., heat-forming) encapsulation about the block, or otherwise encapsulating the block. However, the encapsulated metal hydride pellet can be otherwise manufactured.

Providing a repository S120 functions to provide a carrier for loose metal hydride powder. Providing the repository preferably includes providing a repository having walls that are substantially continuous with a closed end, and can further include stamping, molding, or otherwise manufacturing the repository. Alternatively, providing the repository can include manufacturing the repository from a sheet of repository material. Manufacturing the repository from a sheet of repository material can include wrapping the sheet around a longitudinal mold, sealing or folding the longitudinal edges of the sheet together, and folding an unfolded edge, adjacent the folded edges, toward the longitudinal axis to create the closed end. Manufacturing the repository from a sheet can alternatively include forming the sheet over a mold or any other suitable method of manufacturing a repository from a sheet. However, any suitable repository formed in any suitable manner can be provided.

Depositing metal hydride into the repository S130 functions to introduce a controlled amount of fuel into the repository. Loose metal hydride powder is preferably deposited into the repository, but a cohesive block of metal hydride can alternatively and/or additionally be deposited. The metal hydride powder is preferably deposited through a powder-dispensing nozzle into the open end of a repository, but can alternatively be scooped into the repository, poured into the repository or deposited in any suitable manner. A controlled amount of metal hydride powder is preferably deposited within the repository. The amount of metal hydride can be controlled through weight measurements (e.g., metal hydride is added until the total weight of the apparatus is within a predetermined range, removing metal hydride until the total weight falls within the predetermined range, etc.), volume measurements, flow rate measurements, or any other suitable method of monitoring the mass of metal hydride deposited into the repository. The amount of metal hydride can alternatively be controlled by the volume defined by the repository or by the volume defined by the container. Depositing the metal hydride into the repository can additionally include compacting and regrinding the loose metal hydride powder, which can function to control the particle size and/or crystal structure of the powder. Depositing the metal hydride into the repository can additionally include mixing the metal hydride powder with an additive prior to deposition. The additive can be a binder, accelerator (chemical or otherwise), exothermic reactant, stabilizer, mineral oil for reduced powder sensitivity to water, graphite for increased thermal conductivity, water or water binding compound for heat generation during startup, or any suitable additive. Depositing metal hydride into the repository preferably includes placing the repository within a brace that retains the repository position and prevents the repository from collapsing, and depositing a controlled amount of metal hydride into the repository. However, the metal hydride can be placed within the repository without the use of a brace or with any other suitable support mechanism. Depositing metal hydride into the repository can additionally include depositing a portion of the reaction mechanism into the repository. The deposited portion of the reaction mechanism is preferably the active end of the reaction mechanism, such as the heat-generating end of a heater or the outlet for a liquid reagent. The reaction mechanism can be deposited within the repository before or after metal hydride deposition.

Figure 10:
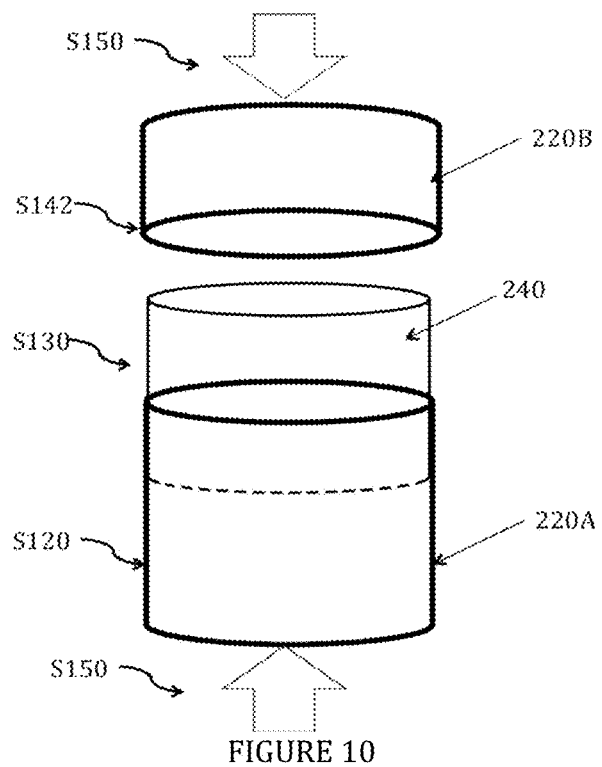
FIG. 10 is a schematic representation of a first variation of a method of manufacturing an encapsulated metal hydride pellet.

Blocking the open end of the repository S140 functions to prevent metal hydride egress from the repository. In a first variation, as shown in FIG. 10, blocking the open end of the repository includes inverting a second repository over the open end of the first repository such that the closed end of the second repository blocks the open end of the first repository S142. The open end of the second repository is preferably sealed about the closed end of the first repository by folding the walls defining the open end of the second repository over the closed end of the first repository, but the open end of the second repository can be otherwise sealed. The assembly is preferably inverted to seal the open end of the second repository from the top, but the open end of the second repository is sealed from the bottom of the repository. Alternatively, the open end of the second repository can be left open, particularly when the second repository is shorter than the first repository, such that the walls of the second repository do not extend past the closed end of the first repository.

Figure 11A:
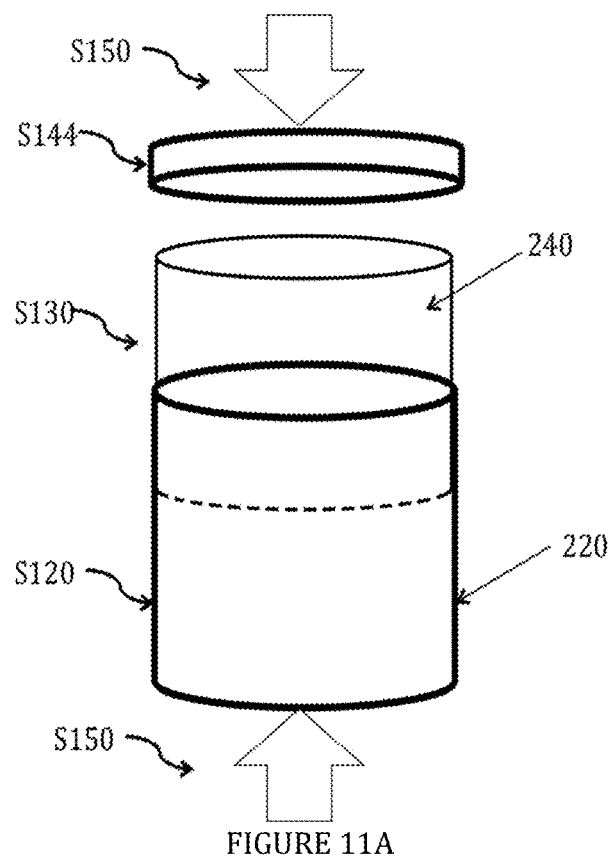
FIGS. 11A and 11B are schematic representations of a second variation of a method of manufacturing an encapsulated metal hydride pellet, including capping the open end of the repository with a pellet cap and folding the open end of the repository over the cap, respectively.
Figure 11B:
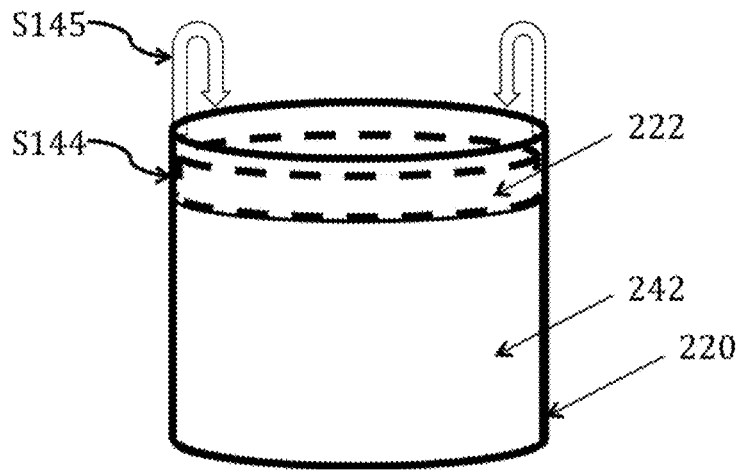

In a second variation, as shown in FIG. 11A, blocking the open end of the repository includes capping the open end of the repository with a pellet cap S144. Alternatively, the open end can be capped by the reaction mechanism. Capping the open end of the repository preferably includes nesting a pellet cap within the repository, wherein the pellet cap preferably has a substantially similar profile to that of the inner repository surface but can alternatively have a different profile. The wall defining the open end of the repository is preferably folded toward the longitudinal axis of the repository S145, over the pellet cap, to block the open end, as shown in FIG. 11B. Alternatively, the pellet cap can have a larger diameter than the repository, wherein the repository nests within the pellet cap.

Figure 12A:
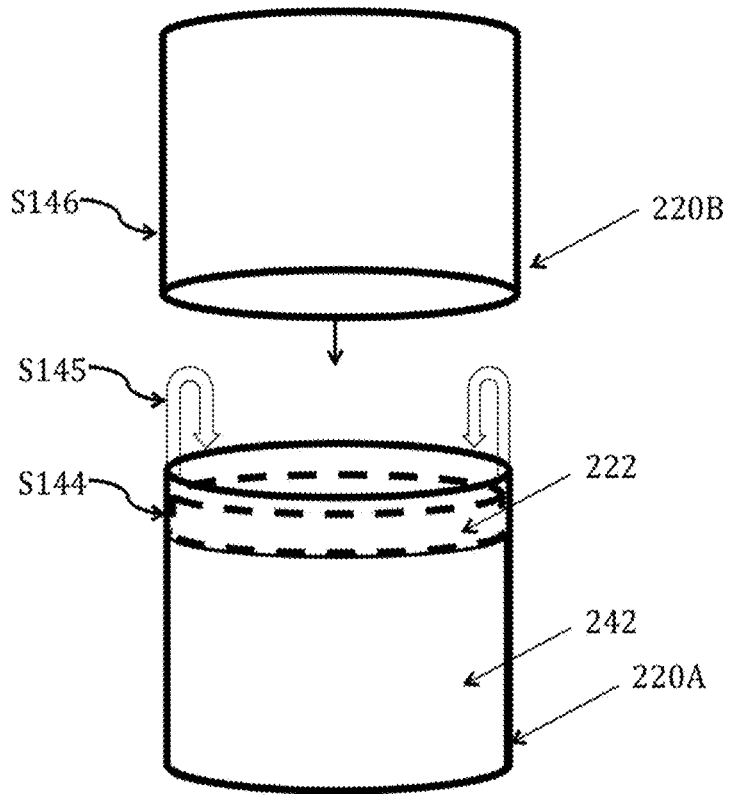
FIGS. 12A, 12B, and 12C are a schematic representation of a third variation of a method of blocking and compressing the encapsulated metal hydride pellet, including blocking the open end of the first repository with a pellet cap and a second repository, sealing the open end of the second repository, and compressing the sealed open end and closed end of the first repository, respectively.
Figure 12B:
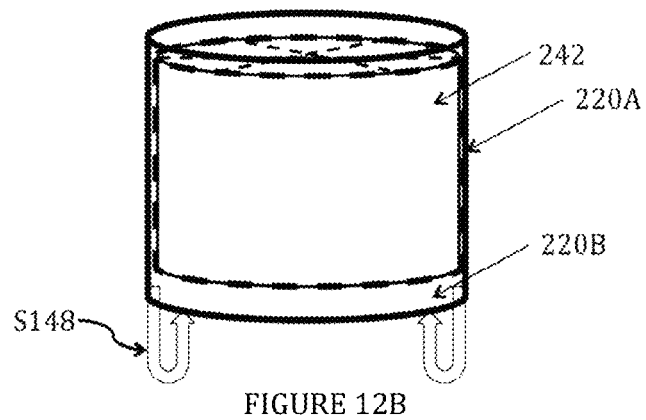

In a third variation, as shown in FIG. 12A, blocking the open end of the repository includes capping the open end of the repository with a pellet cap S144 and nesting the first, capped repository within a second repository S146. The open end of the repository is preferably capped with a pellet cap in the manner described above, but can alternatively be capped in any suitable manner. Nesting the first, capped repository within the second repository preferably includes nesting the repositories such that the pellet cap and previously open end of the first repository are adjacent the closed end of the second repository, and the open end of the second repository is adjacent the closed end of the first repository. However, the repositories can be nested with the closed ends adjacent, such that the open end of the second repository is adjacent the pellet cap, or nested in any suitable manner. The second repository is preferably inverted over the first repository, wherein the second repository is assembled over the previously open end of the first repository. Alternatively, the first repository can be dropped into the second repository, with the closed end of the first repository proximal the closed end of the second repository or with the closed end of the first repository distal the closed end of the second repository. Alternatively, the first repository can be raised into the inverted second repository (e.g., wherein the open end of the second repository is oriented below the closed end). However, the repositories can be nested in any suitable manner. As shown in FIG. 12B, the open end of the second repository is preferably folded over the first repository S148 to substantially retain the metal hydride within the encapsulation. However, the open end of the second repository can be left unfolded, particularly when the second repository is shorter than the first repository, or when the second repository nests over the first repository with an interference or friction fit. However, the open end of the repository can be blocked using any suitable method.

Figure 12C:
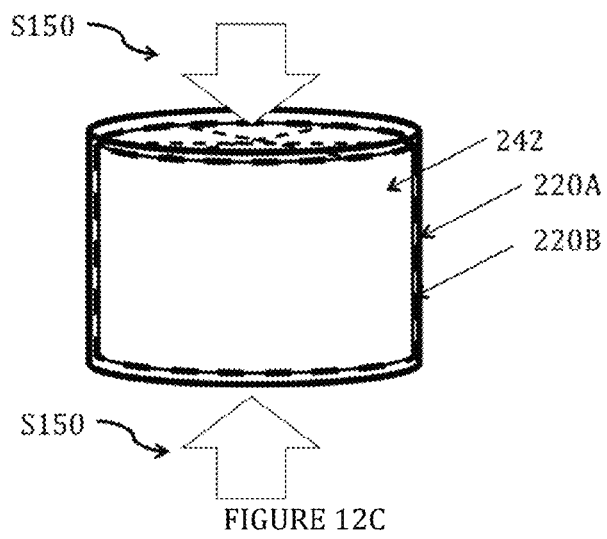

Applying a compressive force to the closed and blocked ends of the repository S150, as shown in FIG. 12 C, functions to compress the repository about the metal hydride and to reduce the metal hydride volume by compacting the metal hydride into a substantially coherent (e.g., singular) block. The powder is preferably compacted such that the compressed pellet has less than 80% of the loose powder volume, but can be compressed to 70%, 60%, 50%, or any suitable fraction of the loose powder volume. The powder is preferably compacted with approximately 40 tons-force, but can alternatively be compressed at higher or lower pressures. The powder is preferably compacted at room temperature, but can alternatively be heated or cooled during compaction. The encapsulated metal hydride pellet is preferably compressed within a mechanical press, wherein the machine press can be a hydraulic press, pneumatic press, arbor press, servomechanism press, forging press, or any other suitable press. The encapsulated metal hydride pellet is preferably formed from die molding techniques, but can alternatively be formed from any other suitable techniques. The encapsulated metal hydride powder is preferably supported within a mold during the compression process, but can alternatively be unsupported or supported in any suitable manner. The press preferably compacts the powder in a vertical manner, wherein the uncompressed encapsulated metal hydride powder is supported by a substantially flat support surface and the press piece applies a downward force against the encapsulated metal hydride powder and support surface. Alternatively, the encapsulated metal hydride powder can be raised by a support surface against a compression surface, wherein the support surface applies an upward force against the encapsulated metal hydride powder and the compression surface. However, the encapsulated metal hydride powder can be compressed horizontally, at an angle, or in any suitable orientation.

Figure 13:
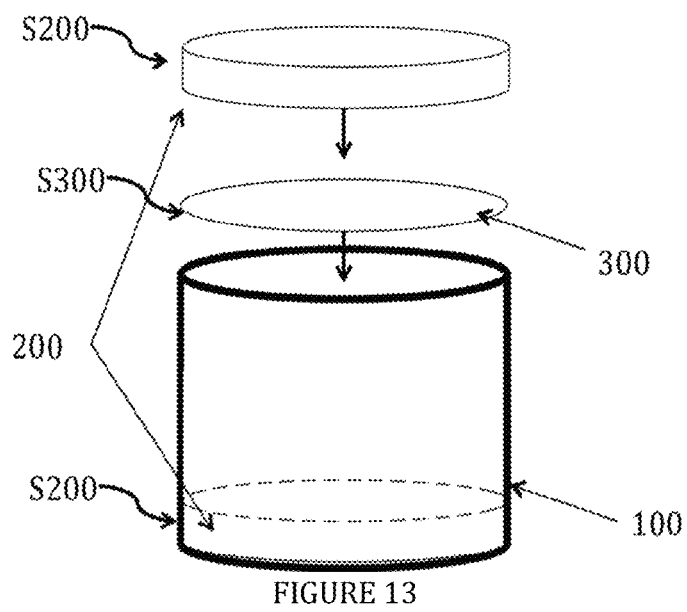
FIG. 13 is a schematic representation of a variation of introducing the metal hydride pellet and the reaction mechanism into the container.
Figure 14A:
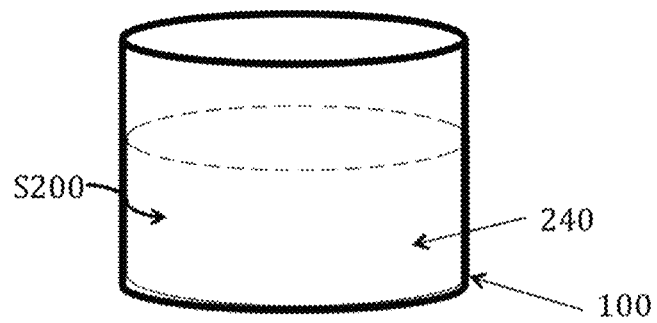
FIGS. 14A, 14B, 14C, and 14D are a schematic representation of a variation of manufacturing the encapsulated metal hydride pellet using the container as a mold, including introducing a volume of encapsulated metal hydride powder into the container, compressing the metal hydride, coupling a reaction mechanism to the encapsulated metal hydride pellet, and introducing a second volume of encapsulated metal hydride powder into the container, respectively.
Figure 14B:
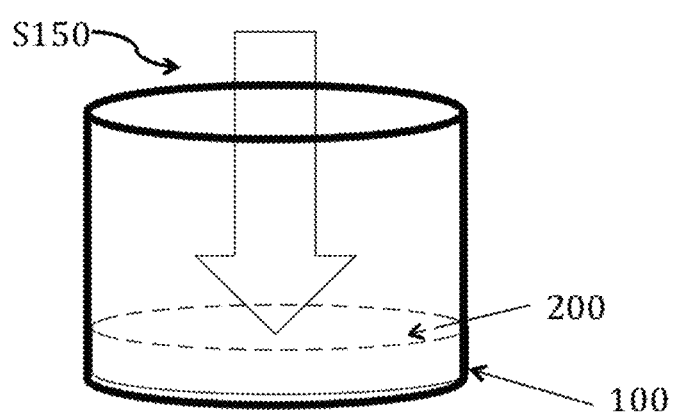

Introducing the encapsulated metal hydride pellet into a container S200 functions to introduce the encapsulated metal hydride pellet into the interior volume of the container. More preferably, a plurality of encapsulated metal hydride pellets are introduced into the interior volume. This can be particularly desirable when the pellets are smaller than the interior volume and are formed individually. The encapsulated metal hydride pellet(s) are preferably introduced into the container until the pellets and optionally, the reaction mechanisms, occupy substantially the entirety of the interior volume, but can alternatively be introduced until the pellets occupy a predetermined portion of the interior volume. This step can be particularly desirable when the pellets are encapsulated within an encapsulation mechanism. Pellet introduction preferably includes the sub-steps of aligning a pellet with the container opening, inserting the pellet, preferably with top-down assembly but alternatively any other suitable assembly method, and repeating the aforementioned steps. The encapsulated metal hydride pellet(s) are preferably arranged within the interior volume with a substantially planar end of the pellet parallel to a substantially planar end of the container (e.g., container bottom), but can alternatively be arranged with the longitudinal axis of the pellet parallel the container end, or in any suitable configuration. As shown in FIG. 13, the encapsulated metal hydride pellet is preferably deposited into the interior volume after compaction. Alternatively, the encapsulated metal hydride pellet can be compacted within the container, wherein the container functions as the mold that supports the metal hydride pellet during compaction. In a first variation of encapsulated metal hydride pellet compaction within the container, as shown in FIG. 14A, a volume of encapsulated metal hydride powder can be introduced into the interior volume and compacted, and the process repeated for a plurality of encapsulated metal hydride powder volumes as shown in FIG. 14D. In a second variation, as shown in FIG. 14B, a plurality of encapsulated metal hydride powder volumes can be introduced into the interior volume and simultaneously compressed during one compression step. However, the encapsulated metal hydride pellet can be introduced into the container in any suitable manner.

Figure 14C:
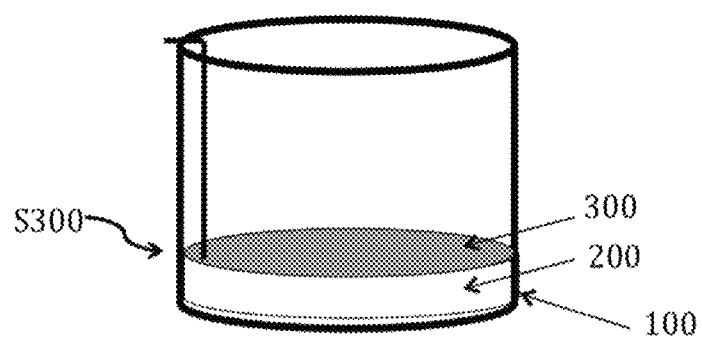
Figure 14D:
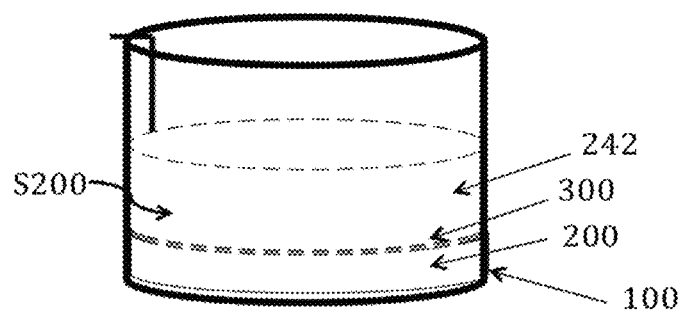

Coupling the reaction mechanism with the encapsulated metal hydride pellet S300, as shown in FIG. 14C, functions to configure the cartridge for substantially controlled fuel release. The reaction mechanism is preferably a heating mechanism or a thermally conductive component, wherein coupling the reaction mechanism preferably includes thermally coupling the reaction mechanism to the metal hydride, wherein the reaction mechanism facilitates heat transfer to the metal hydride to thermolyse the metal hydride into a waste product (e.g., aluminum) and fuel (e.g., hydrogen). Heat is preferably conducted through the encapsulation to the metal hydride fuel, but can alternatively be transferred through radiation, convection (e.g., by the fuel flowing out of the container), or through any other suitable heat transfer mechanism. The heating mechanism is preferably a resistive heater, more preferably a substantially planar and deformable or flexible heater, but can alternatively be a substantially stiff heater. Alternatively, the reaction mechanism can be a liquid reagent outlet, or any other suitable component that facilitates fuel generation from the metal hydride. Coupling the heating mechanism with the metal hydride pellet preferably includes aligning a broad face of the heating mechanism with a substantially planar end of the encapsulated metal hydride pellet. Alternatively, coupling the heating mechanism can include wrapping the broad face of the heating mechanism about an arcuate surface of the encapsulated metal hydride pellet, or include any other suitable coupling to the metal hydride. In one variation, the reaction mechanism can be coupled to the encapsulated metal hydride pellet after the encapsulated metal hydride pellet has been placed within the internal volume. In another variation, the reaction mechanism can be coupled to the encapsulated metal hydride pellet prior to pellet insertion into the interior volume. In another variation, the reaction mechanism can be placed within the interior volume prior to pellet introduction (e.g., retained against the interior volume walls, laid along the interior volume bottom, etc.).

Coupling the heating mechanism with the metal hydride pellet can additionally include applying a thermal interface between the pellet and the heating mechanism. The thermal interface is preferably applied to the pellet and/or heating mechanism surface prior to coupling the heating mechanism to the pellet, but can alternatively be applied during or after coupling. The thermal interface preferably functions to fill gaps between the heating mechanism and the pellet to facilitate more efficient heat transfer. The thermal interface can include thermal grease, metal hydride powder (e.g., of the same or of a different composition than that within the enclosed metal hydride pellet), or any other suitable solid, liquid, or gel thermal interface. Coupling the heating mechanism to the pellet with a thermal interface can additionally include compressing the heating mechanism against the pellet after thermal interface application.

Multiple reaction mechanisms are preferably included within each fuel source, but the fuel source can alternatively include a singular reaction mechanism or any suitable number of reaction mechanisms. In one variation, the fuel source includes at least one reaction mechanism for each pellet, wherein the pellets and reaction mechanisms alternate along the longitudinal axis of the fuel source. In another variation, each pellet is coupled to a first and a second reaction mechanism, wherein adjacent pellets can share a reaction mechanism. In another variation, each pellet is coupled to a single reaction mechanism, wherein the reaction mechanisms are inserted between every other pellet. However, the pellets and reaction mechanisms can be arranged in any suitable manner.

The fuel source with multiple reaction mechanisms are preferably assembled by introducing a reaction mechanism into the interior volume at the given frequency (e.g., after every pellet for the first variation, after every other pellet for the second variation, etc.), and repeating the aforementioned steps until the interior volume is substantially filled. The pellet and reaction mechanisms can alternatively be assembled prior to introduction into the interior volume. The pellet and reaction mechanisms can alternatively be assembled prior to pellet compaction, wherein the encapsulated metal hydride powder and reaction mechanisms are assembled within the container in the desired arrangement, then the entire assembly compacted.

Enclosing the pellet and reaction mechanism within the container S200 functions to retain the pellet within the container and to substantially seal the container. Enclosing the pellet and reaction mechanism preferably includes sealing an open container end with a cap, but can alternatively include heat forming a sealant material over the open container end or otherwise sealing the container. Enclosing the pellet and reaction mechanism within the container can additionally include retaining the connections for the reaction mechanism and/or sensors. The connections can be electrical connections, data connections, fluid connections, or any other suitable connection. A portion of the connections are preferably retained on the exterior of the container for external connection to the fuel generator during enclosure, but can alternatively be retained for connection to the cap interior, wherein the connections are preferably connected to the cap prior to enclosure. Enclosing the pellet and reaction mechanism within the container can additionally include introducing a compression member into the interior volume prior to sealing, wherein the compression member applies a compressive force against the pellets and/or reaction members.

As a person skilled in the art will recognize from the previous detailed description and from the figures and claims, modifications and changes can be made to the preferred embodiments of the invention without departing from the scope of this invention defined in the following claims.

We claim:

1. A method of manufacturing a metal hydride fuel source that reduces fuel source expansion during fuel release, comprising:
    providing a first and a second malleable repository, each defining an open end and a closed end opposing the open end;
    depositing metal hydride powder into the first repository;
    encapsulating the metal hydride powder between the first and second repository by nesting the second repository with the first repository;
    applying a compressive force to the closed ends of the first and second deformable repositories, the compressive force sufficient to compress the powder into a substantially cohesive pellet; and
    encapsulating the pellet between the first repository and a cap and then nesting the second repository over the first repository such that the cap and the pellet are encapsulated between the first and second repositories.

2. The metal hydride fuel source of claim 1, wherein encapsulating the metal hydride powder further comprises sealing the metal hydride powder between the first and second repositories by folding an edge defining the open end of the second repository over the closed end of the first repository.

3. The metal hydride fuel source of claim 1, further comprising compacting and regrinding the metal hydride powder prior to depositing the metal hydride powder into the first repository.

4. The metal hydride fuel source of claim 1, wherein applying a compressive force to the closed ends of the first and second repository comprises compressing an uncompressed fuel source with a die press.

5. The metal hydride fuel source of claim 1, wherein the compressive force is sufficient to fuse one or more particulates of the metal hydride powder to the first repository.

6. The metal hydride fuel source of claim 1, wherein the compressive force is sufficient to change the crystal structure of the metal hydride.

7. A method of manufacturing a metal hydride fuel source comprising:
   manufacturing an encapsulated metal hydride pellet, comprising:
      providing a first and a second malleable repository, each repository defining an open end and a closed end opposing the open end;
      depositing loose metal hydride powder into the first repository;
      encapsulating the metal hydride powder between the first and second repository by nesting the second repository with the first repository; and
      applying a compressive force to the closed ends of the first and second deformable repositories, the compressive force sufficient to compress the powder into a substantially cohesive pellet;
   inserting the encapsulated pellet into an internal volume defined by a substantially rigid carrier, the internal volume having substantially the same perimeter as the encapsulated pellet;
   thermally coupling a heating mechanism to the encapsulated pellet within the carrier; and
   encapsulating the encapsulated pellet and heating mechanism within the internal carrier by a cap, the encapsulated pellet and heater substantially filling the volume defined between the carrier and the cap.

8. The metal hydride fuel source of claim 7, wherein the cap forms a substantially fluid impermeable seal with the carrier, the cap further comprising a fuel outlet fluidly connecting the carrier exterior to the internal volume.

9. The metal hydride fuel source of claim 7, further comprising applying a thermal interface between the heating mechanism and the pellet.

10. The metal hydride fuel source of claim 9, wherein the thermal interface comprises metal hydride.

11. The metal hydride fuel source of claim 9, wherein the thermal interface comprises thermal grease.

12. The metal hydride fuel source of claim 7, wherein the second repository nests over the first repository, the open end of the second repository proximal the closed end of the first repository.

13. The metal hydride fuel source of claim 7, wherein applying a compressive force comprises compressing the encapsulated metal hydride pellet within the carrier, wherein the carrier applies a compressive force to the closed end of the first repository.

14. The metal hydride fuel source of claim 7, wherein inserting the encapsulated pellet into the internal volume comprises inserting into the internal volume a plurality of planar resistive heating mechanisms alternating with a plurality of encapsulated pellets.

15. The metal hydride fuel source of claim 7, wherein the carrier comprises thermal insulation.

\* \* \* \* \*